United States Patent Office 3,399,227
Patented Aug. 27, 1968

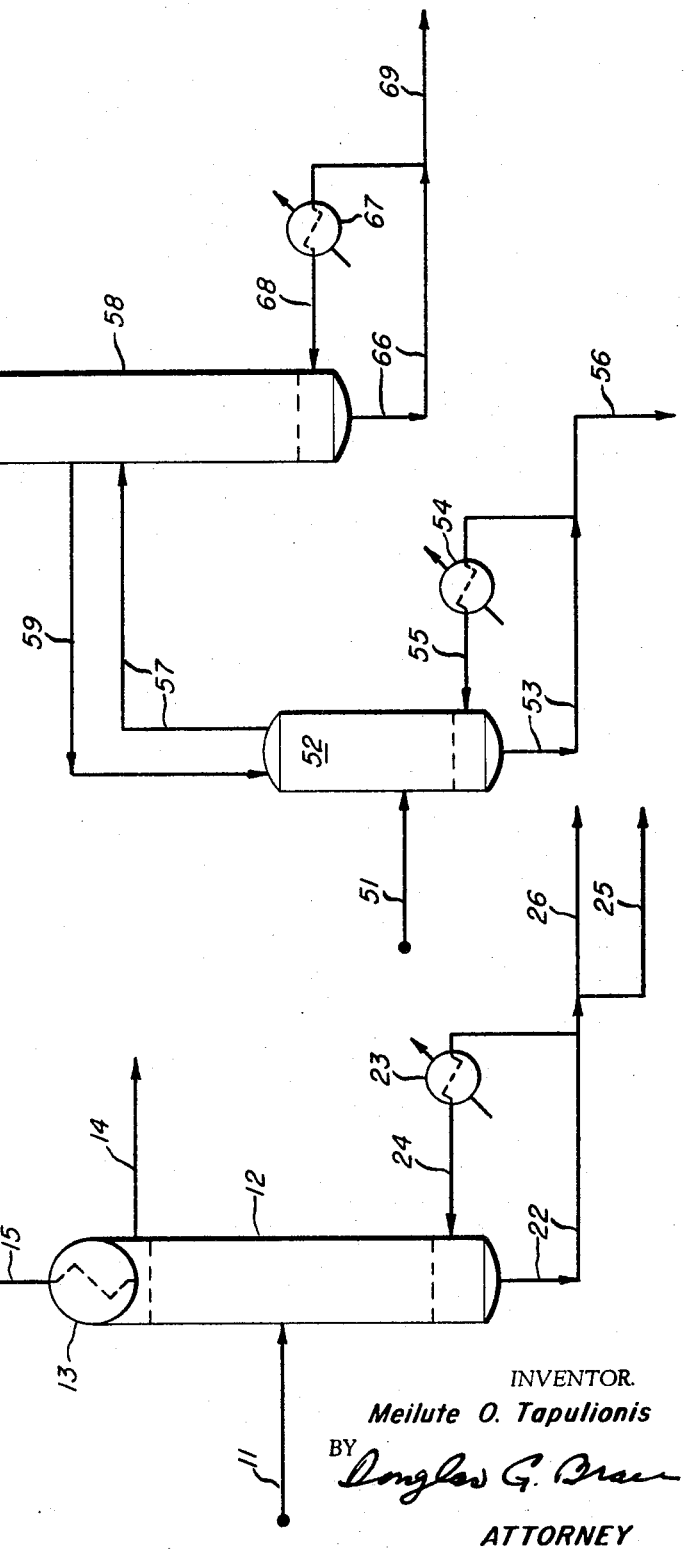

3,399,227
RECOVERY OF PURIFIED DIMETHYL TEREPH-
THALATE FROM MOTHER LIQUOR STRIPPER
BOTTOMS
Meilute O. Tapulionis, Chicago, Ill., assignor to Standard Oil Company, Chicago, Ill., a corporation of Indiana
Filed July 31, 1963, Ser. No. 298,924
3 Claims. (Cl. 260—475)

This application relates to the manufacture of dimethyl terephthalate, and specifically to the recovery of dimethyl terephthalate from mother liquor stripper bottoms.

Terephthalic acid is now in major commercial use as a raw material for making polyesters from which are made fibers and films. Commercially, the terephthalic acid used for such purposes is made by the oxidation of dialkyl benzenes, generally xylenes. The oxidation is done with nitric acid, or with molecular oxygen using a heavy metal catalyst, preferably in the conjoint presence of bromine. However, the terephthalic acid made by such oxidation processes often contains small amounts, 0.2–5%, of impurities which interfere with the manufacture of high quality polyesters. For this reason, the terephthalic acid is conventionally converted to dimethyl terephthalate which may be manufactured on a commercial scale to a purity of greater than 99.9%. The dimethyl terephthalate is then converted to a polyester, generally using ethylene glycol in a transesterification reaction.

Dimethyl terephthalate is readily made by esterifying at elevated temperatures with a molecular excess of methanol the terephthalic acid made by the foregoing processes, using sulfuric acid or a metal or metal oxide, such as zinc oxide, as a catalyst; see, for instance, U.S. Patents Nos. 2,459,614 and 2,491,660. The esterification reaction solution is cooled to crystallize the dimethyl terephthalate, which is then separated from the mother liquor by filtering or centrifuging. The solid crystalline dimethyl terephthalate is usually further refined by distillation. The purified product dimethyl terephthalate is removed as a side stream during such distillation, while a small percentage of the distillation tower feed, about 1–5%, containing higher boiling materials such a monomethyl terephthalate, condensation products and metal contaminants, is rejected from the system. An overhead forecut is taken, which may vary from 5 to 35 or 40% of the distillation tower charge, and recycled to the oxidation reactor. The esterification and purification steps may be conducted by batch or continuous processing.

After the separation of the crystallized dimethyl terephthalate from the mother liquor, the mother liquor is stripped of methanol and water by distillation in a column generally referred to as a stripper. The aqueous methanol overhead fraction is dehydrated and anhydrous methanol recycled to the esterification reactor. The bottoms product from the stripper, referred to as mother liquor stripper bottoms, contains a substantial fraction, often more than 50%, of dimethyl terephthalate, and also includes varying percentages of monomethyl terephthalate, methyl formyl benzoate, methyl toluates, and small amounts, on the order of 0.5% or less, of various metal contaminants from the oxidation and esterification reactions. Conventionally, the mother liquor stripper bottoms have been discarded, because of the impracticality of recovering therefrom the dimethyl terephthalate and other organic material, or a major fraction discarded with a minor fraction recycled to the up-stream esterification or crystallization zones. Only a minor fraction can be so recycled without either an intolerable build-up of impurities in the product dimethyl terephthalate, or an equally intolerable yield loss of acceptable quality product.

Experience has shown that the maximum amount of product dimethyl terephthalate which may be recovered from the foregoing manufacturing system (when using, for instance, a terephthalic acid of about 97% purity and a 5:1 mol ratio of methanol to terephthalic acid during esterification) is about 0.98 pound of dimethyl terephthalate per pound of terephthalic acid charged to the esterification reactor. As used herein, product dimethyl terephthalate refers to such a material having an acid number, expressed as milligrams of equivalent KOH per gram of sample, of not more than 0.05 and being of purity sufficient to manufacture into clothing fiber grade polyesters. This represents a loss of 16%, inasmuch as the theoretical yield of dimethyl terephthalate is 1.17 pounds per pound of terephthalic acid. This invention is directed to means of significantly reducing the loss of dimethyl terephthalate, and increasing its yield to the range of 1.04 to 1.12 pounds per pound of terephthalic acid.

I have now discovered a technologically and economically feasible method of recovering dimethyl terephthalate and other organic residues from mother liquor stripper bottoms whereby the over-all yield of dimethyl terephthalate is increased to the range of 1.04 to about 1.12 pounds per pound of terephthalic acid. In this process, mother liquor stripper bottoms, obtained from the esterification of terephthalic acid derived from the oxidation of dialkyl benzenes, is distilled in a primary distillation tower operated at subatmospheric pressure. In this tower, methyl formyl benzoate and lower boiling constituents are taken as a distillate fraction and are either purged from the system or recycled to the dialkyl benzene oxidation reactor. The bottoms fraction from the primary distillation tower comprises dimethyl terephthalate and higher boiling materials. A minor proportion of the bottoms fraction is purged from the system to avoid the build-up of metal contaminants, while the major portion of the bottoms fraction is recycled to the dimethyl terephthalate crystallization zone, wherein dimethyl terephthalate is crystallized from a methanolic solution. The major portion of the primary distillation tower bottoms fraction may be sent directly to the crystallization zone, or it may be sent to such zone by way of the terephthalic acid esterification reactor.

In a second embodiment of the invention, the mother liquor stripper bottoms are charged to an auxiliary tower from which dimethyl terephthalate and lower boiling constituents are taken as an overhead fraction, and monomethyl terephthalate and higher boiling constituents are removed as a bottoms fraction and purged from the system. The auxiliary tower overhead fraction comprises the feed to the primary distillation tower. Reflux for the auxiliary tower is obtained by taking a side stream from the primary tower at a point between the feed inlet and the top plate of the primary tower. Methyl formyl benzoate and lower boiling constituents are removed as a distillate product from the primary tower, and substantially purified dimethyl terephthalate is removed from the bottom of the tower, and recycled to the aforesaid crystallization zone. Either embodiment may be operated in a batch or continuous basis.

Use of either of the foregoing schemes permits a large fraction of the mother liquor stripper bottoms to be recycled, thus increasing the recovery of dimethyl terephthalate. In addition, the resulting reduction in the concentration of impurities during the final purification by distillation of dimethyl terephthalate results in a greater yield of high purity product dimethyl terephthalate (as a result of taking a smaller forecut) and also simplifies the operation of purification distillation as well as reducing the amount of material handled at various stages, from esterification through final purification, of a dimethyl terephthalate plant.

The composition of the mother liquor stripper bottoms will vary considerably depending upon the operation of the oxidation, esterification and crystallization processes;

the purity of the terephthalic acid charged to the esterification zone, the ratio of methanol to acid in the esterification zone, and of methanol to ester in the crystallization zone, and the fraction, if any, of the mother liquor stripper bottoms recycled to the esterification zone, considerably influence the composition of the mother liquor stripper bottoms stream. Illustrative compositions of mother liquor stripper bottoms are set forth in the following table:

| Sample No. | Composition, wt. percent | | |
|---|---|---|---|
| | 1 | 2 | 3 |
| Dimethyl terephthalate | ca. 50 | 44.6 | 57.7 |
| Dimethyl isophthalate | 2.05 | | |
| Monomethyl terephthalate | 7.9 | 16.5 | ca. 10 |
| Monomethyl isophthalate | (*) | | |
| Methyl formyl benzoate | 15.5 | 6.5 | 10.1 |
| Methyl toluate | 1.79 | | 1.21 |
| Total metals | ca. 0.39 | 0.1 | (*) |

In the table, an asterisk indicates that no data are available for the compound in question. The remainder of the mother liquor stripper bottoms of such samples is unidentified high boiling organic material. Generally, total metals are less than 1%.

Wide variations in the composition of the mother liquor stripper bottoms do not adversely effect the operation of the process, although particulars of the design of the equipment and operating variables must take into account the expected composition of mother liquor stripper bottoms to be processed in accordance with well known chemical engineering techniques.

The primary tower is operated at subatmospheric pressure, generally in the range of 0.01 atmosphere to about 0.5 atmosphere, advantageously at about 0.1 atmosphere absolute pressure. The reduced pressure in the primary tower may be obtained by conventional means, such as a steam ejector, or, with small scale equipment, a vacuum pump.

The pressure used in the primary tower influences the temperatures at which such tower is operated. The overhead condensing temperature will range from approximately 260 to about 460° F. as the tower pressure, which is measured generally at the overhead condenser, varies from about 0.01 to about 0.5 atmosphere absolute, respectively. Likewise, the temperature of the bottoms fraction from the primary tower will vary from approximately 460 to about 560° F. as the pressure is varied over the foregoing range.

The mother liquor stripper bottoms are charged to the primary distillation tower in the molten state, such as at a temperature in the range of about 300–600° F., advantageously in the range of about 350 to 500° F.

The design of the primary distillation tower follows conventional engineering practice. For mother liquor stripper bottoms of the compositions referred to above, about 20 theoretical plates are generally used. The primary tower may use conventional distillation trays, or may be packed with rachig rings, wire mesh or other distillation tower packing materials. No special precautions need be taken in operating the tower other than the maintenance of the desired pressure and the preventing of flooding.

The operation of the process is next described with reference to FIGURE 1, a schematic flow sheet from which conventional equipment such as pumps, valves, surge drums, and the like have been omitted. Mother liquor stripper bottoms, having the composition of sample 2 in the foregoing table, is charged through line 11 to primary distillation tower 12, which contains 20 theoretical plates. Methyl formyl benzoate is condensed in a hot condenser 13 which is shown integral with primary tower 12, although the hot condenser may be constructed separately from the tower. The hot condenser is operated at a pressure of about 80 millimeters of mercury absolute and at a condensing film temperature of about 365° F. Generation of low pressure steam is a suitable means of heat removal, although other heat transfer media may be used. It is desirable to keep the condenser's hot side skin temperature above the melting point of dimethyl terephthalate. Methyl formyl benzoate is removed as a distillate fraction from the top tray of the distillation column through line 14, as shown in FIGURE 1, or directly from the hot condenser. This distillate fraction may be discarded or returned to the oxidation reactor in which the dialkyl benzenes are oxidized to terephthalic acid.

Low boiling constituents which are not condensed in hot condenser 13 pass through line 15 into cold condenser 16, sometimes referred to as a freeze-out condenser, and generally water-cooled, wherein such constituents are condensed and discharged from the system through line 17. Subatmospheric pressure is maintained on the system by means of steam ejector 18 which is connected to the distillation tower through the two condensers by means of line 19. Steam enters the ejector through line 20 and is rejected through line 21.

The liquid from the bottom of the tower is withdrawn through line 22. A portion of this stream is passed through reboiler 23 and line 24 and returned to the bottom of the primary distillation tower. The remainder of the liquid is split into two portions, the lesser portion being discharged from the system through line 25, and the major portion being withdrawn through line 26 and recycled to either the reactor in which terephthalic acid is esterified, or the crystallizer in which dimethyl terephthalate is crystallized from the methanolic esterification reactor solution, neither of which are shown in FIGURE 1. The liquid withdrawn through line 26 comprises 81% of the dimethyl terephthalate charged through line 11.

Use of the foregoing procedure permits recovery of about 1.04 pounds of dimethyl terephthalate per pound of terephthalic acid when the primary distillation tower bottoms recycle rate, that is, the material withdrawn through line 26 amounts to 50% by weight of the stripper bottoms charged through line 11, and about 1.10 pounds of terephthalic acid when the primary distillation tower bottoms recycle rate is 85%.

Such procedure, using as it does only one distillation tower for processing of mother liquor stripper bottoms, is less expensive than a two-tower scheme, and is preferable where the impurities boiling lower than dimethyl terephthalate are relatively greater than those boiling higher than dimethyl terephthalate, when the lower boiling impurities are relatively more deleterious to the quality for polyester fiber manufacture of the product dimethyl terephthalate, where the concentration of monomethyl terephthalate in the mother liquor stripper bottoms is high, or where tht terephthalic acid is contaminated with relatively great amounts, such as 1–3%, of isophthalic acid. On the other hand, a two-tower scheme, such as described further herein after in connection with FIGURE 2, is more preferable where the high boiling impurities are relatively more detrimental to product quality, or where the amount and character of such impurities is such that the recycle of a large fraction of the material in line 22 results in the saturation of the dimethyl terephthalate-methanol solution with one or more of them, thus causing its or their crystallization with the dimethyl terephthalate in tht crystallization zone, and thereby reducing substantially the fraction of material in line 22 which may be removed through line 26 while maintaining satisfactory product quality.

FIGURE 2 illustrates a second embodiment of the invention. Mother liquor stripper bottoms having a compositions as shown for sample 2 in the foregoing table is charged through line 51 to auxiliary tower 52 which contains about 15 theoretical distillation plates. Tower 52 is operated at a pressure slightly greater than the operational pressure of hereinafter mentioned tower 58. The liquid from the bottom of tower 52 is withdrawn through line 53, a portion being passed through reboiler 54 and line 55 and returned to the base of tower 52, and the remaining being withdrawn through line 56 and rejected from the system as purge. The material withdrawn through line 56 comprises monomethyl terephthalate and other orgnaic material boiling above dimethyl terephthalate, residual metal contaminants, and in the range of 5–10 weight percent dimethyl terephthalate.

The overhead vapors from tower 52 are passed through line 57 into primary distillation tower 58. As before, primary tower 58 contains 20 theoretical plates and is operated at a pressure of 80 millimeters of mercury absolute. A liquid side stream is removed from tower 58 and passed through line 59 back to auxiliary tower 52, providing reflux for that tower. Methyl formyl benzoate and other relatively low-boiling mono-nuclear aromatic compounds are condensed in hot condenser 60 and removed as distillate product through line 61 from whence they may be purged from the system, or, more preferably, recycled to the oxidation reactor. Constituents which are not condensed in hot condenser 60 pass through line 62 into cold condenser 63, wherein they are condensed and purged from the system through line 64. As in the description of FIGURE 1, reduced pressure is maintained on primary tower 58 by means of a steam ejector 65.

Liquid is withdrawn from the bottom of primary tower 58 through line 66, and a portion is returned to the base of the tower by way of reboiler 67 and line 68. The remainder of the liquid from the bottoms is withdrawn through line 69, and comprises 95% dimethyl terephthalate. Inasmuch as this purity is insufficient for commercial dimethyl terephthalate, the stream from line 69 is recycled to the reactor where terephthalic acid is esterified with methanol, or directly to the crystallizer where dimethyl terephthalate is crystallized from its methanolic esterification reactor liquid.

The process described in connection with FIGURE 2 permits the recovery of esterification plant product dimethyl terephthalate in the amount of 1.07 pounds per pound of terephthalic acid when the stream terephthalate withdrawn through line 56 as bottoms from auxiliary tower 52 is 12.5 weight percent dimethyl terephthalate, and 1.08 pounds per pound of terephthalic acid when the dimethyl terephthalate concentration in line 56 is 5 weight percent.

Hence, by practicing either embodiment of this invention, it is possible to reduce substantially the loss of theoretical dimethyl terephthalate yield which has been suffered heretofore in converting terephthalic acid to dimethyl terephthalate.

Having thus described the invention, what is claimed is:
1. In a process for the preparation of dimethyl terephthalate by the esterification of terephthalic acid with methanol using an excess of methanol to obtain an esterification reaction mixture, crystallizing and separating crystalline dimethyl terephthalate from the esterification reaction mixture leaving a methanol mother liquor, and distilling the methanol mother liquor to remove therefrom substantially all of the methanol and all of the water as an overhead fraction leaving as a bottoms fraction mother liquor stripper bottoms; the improvement which comprises distilling at subatmospheric pressure said mother liquor stripper bottoms to obtain as an overhead fraction materials boiling below dimethyl terephthalate and to obtain a purified dimethyl terephthalate as bottoms fraction and recycling a major portion of this bottoms fraction to a crystallization zone where dimethyl terephthalate is crystallized from methanol solution.

2. In a process for the preparation of dimethyl terephthalate by the esterification of terephthalic acid with methanol using an excess of methanol to obtain an esterification reaction mixture, crystallizing and separating crystalline dimethyl terephthalate from the esterification reaction mixture leaving a methanol mother liquor, and distilling the methanol mother liquor to remove therefrom substantially all of the methanol and all of the water as an overhead fraction leaving as a bottoms fraction mother liquor stripper bottoms; the improvement which comprises subjecting said mother liquor stripper bottoms to two subatmospheric pressure distillation steps in which steps mother liquor stripper bottoms are first distilled at subatmospheric pressure with an intermediate fraction from the second subatmospheric pressure distillation step to obtain a first overhead fraction containing dimethyl terephthalate and lower boiling constituents of said motor liquor stripper bottoms and to obtain a first bottoms fraction, said first overhead fraction of mother liquor stripper bottoms is then distilled in the second subatmospheric distillation to obtain a second overhead fraction, an intermediate fraction for recycle to said first distillation and a second bottoms fraction and in which the subatmospheric pressure of first distillation is greater than the subatmospheric pressure in the second distillation.

3. The process of claim 1 wherein said bottoms fraction is recycled to the esterification zone of terephthalic acid from which said bottoms with first ester product passes to the esterification zone.

References Cited
UNITED STATES PATENTS
3,047,612    7/1962    Pennington et al. _____ 260—475

OTHER REFERENCES
Vogel: "Practical Organic Chemistry," John Wiley and Sons, New York, 1957, pp. 135–136.

Weisberger: "Technique of Organic Chemistry," vol. III, Interscience Publishers, Inc., New York, p. 428.

LORRAINE A. WEINBERGER, *Primary Examiner*.

T. L. GALLOWAY, *Assistant Examiner*.